July 16, 1929. N. O. HOUGHTON 1,721,119
CONDUIT CLAMP FOR KNOCK-OUT BOXES
Filed Oct. 30, 1926
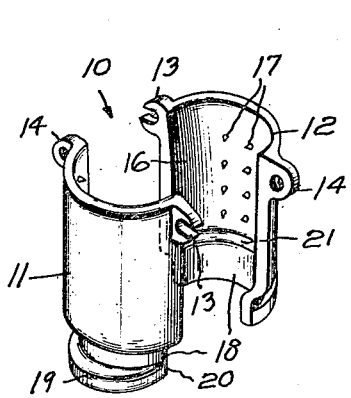
FIG-1-
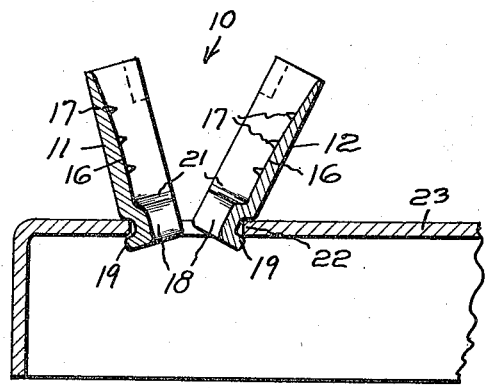
FIG-2-
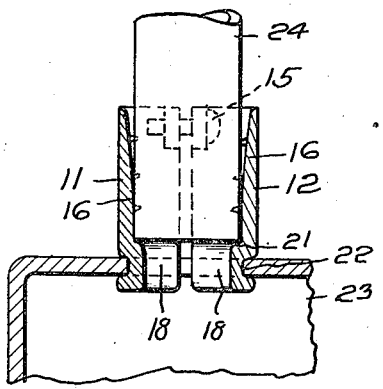
FIG-3-
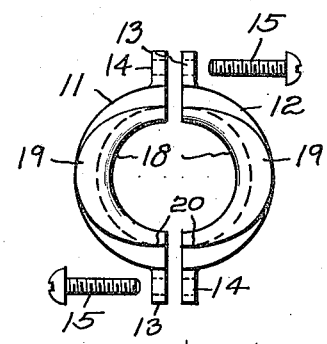
FIG-4-
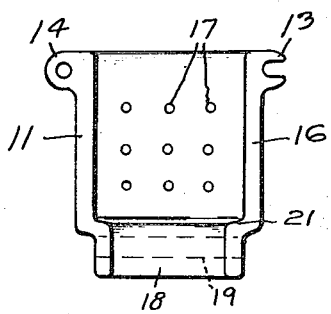
FIG-5-
Inventor
Norman O. Houghton,
By
HIS Attorney Patented July 16, 1929.

1,721,119

UNITED STATES PATENT OFFICE.

NORMAN O. HOUGHTON, OF WASHINGTON, DISTRICT OF COLUMBIA.

CONDUIT CLAMP FOR KNOCK-OUT BOXES.

Application filed October 30, 1926. Serial No. 145,166.

This invention relates to an improved clamp for securing electric conduits to outlet boxes, and has particular reference to such a clamp adapted to effect a rigid connection between such outlet box and the conduit.

An important object of the invention resides in the provision of a clamp as above noted having means for effecting a positive ground connection between the conduit and the outlet box.

Much difficulty has been experienced in providing a suitable connection for electric conduits whereby such connection may be made without the necessity of removing the outlet box as is now the case where bushings are employed, and it was this and other highly objectionable features which the applicant seeks to overcome. The connection to be hereinafter described will afford a most rigid support between the outlet box and the conduit, while at the same time providing a positive ground connection therebetween.

A further object of the invention resides in the provision of a clamp of extremely simple construction, unusually cheap of manufacture, strong, durable and highly efficient in use.

Other important objects and advantages of the invention will be apparent during the course of the following description reference being had to the accompanying drawings, in which like numerals are employed to designate like parts throughout.

Referring to the drawings,

Figure 1 is a perspective view of a complete clamp constructed in accordance with the invention, Figure 2 is a sectional view illustrating the method of attaching the clamp to the outlet box, Figure 3 is a similar view with the conduit in clamped position, Figure 4 is a bottom plan view of the complete clamp, and, Figure 5 is an inner face view of one half of the clamp.

Referring specifically to the drawings, the numeral 10 designates my improved clamp as a whole, formed in sections 11 and 12. As clearly shown each section is formed semicylindrical and provided with a pair of integral apertured ears 13 and 14, the ears 13 having enlarged smooth bores or forked as shown, while the ears 14 are drilled and tapped for the reception of draw bolts 15. It will be noted that the two parts are formed identical, which will avoid the necessity of using care in selecting any pair of sections for assembly.

As clearly shown, the inner faces of the clamp sections are formed upon an arc, as at 16, with the thickest portion of the material adjacent the bottom of the section. This arcuate face is provided with a plurality of pointed lugs 17, any desirable number being employed, and these lugs are adapted to engage and bite into the metal of the conduit at assembly. The purpose of the arcuate faces is to provide a suitable fulcrum for spreading the lower ends of the sections, and it will be obvious that after a conduit has been inserted within the clamp and the bolts 15 drawn up tightly, a rolling action will have been imparted to the sections 11 and 12 due to the arcuate faces 16, such action obviously causing the lower ends of the sections to move outwardly.

Means are provided for rigidly securing the clamp within the conventional knock-out box opening, and this means is in the form of segmental grooved flanges 18, formed integral with the lower ends of the sections 11 and 12. It will be seen by reference to Figure 4 that the bottom of the groove is concentric with the body of the sections 11 and 12, while the flanged portion 19 decreases in depth toward the sides, finally merging into the main or straight portion of the flange 18, as at 20. It will be observed that the portion 19 is flush with the outer faces of the sections 11 and 12, while the concentric line of the groove is just sufficiently small to enter the conventional knock-out opening. The sections 11 and 12 are slightly spaced at assembly so as to permit them to readily fulcrum upon the faces 16. The forming of the flanges 18 provide shoulders 21, and these shoulders are adapted to receive thereon the end of the conduit to be clamped, and act as a means to limit the insertion of such conduit within the clamp.

The operation of the device is as follows:—

A pair of clamp sections 11 and 12 are brought face to face. They are then inclined away from each other at their upper ends so as to permit the insertion of the flanges 19 through the knock-out opening 22 of the outlet box 23, it being understood that the widest portions of the flanges 19 have a greater diameter than the openings 22. The sections are then brought together causing the flanges 19 to engage beneath the edges of the opening 22. The bolts 15 are then inserted within their respective ears and the device is ready for the conduit 24. The conduit is then inserted between the sections 11 and 12 until its lower end rests upon the shoulders 21. The bolts 15 are then drawn up tightly causing the lower ends of the sections 11 and 12 to spread outwardly, and this spreading action causing the flanges 19 and 18 to firmly bind upon the edges of the opening 21. This spreading action as above pointed out, is caused by the rolling action imparted to the sections due to the arcuate faces 16. A continuous tightening of the bolts 15 will cause the pointed lugs 17 to bite into the metal of the conduit 24, thus providing a very positive ground connection while at the same time providing a very rigid means for preventing displacement of the conduit. The powerful binding of the flanges 18 and 19 against the edges of the opening 22 also provides a very efficient ground connection to the box 23. This grounding of the conduit and outlet box is essential in the installation of a wiring system, and is required by the laws governing such installation.

It will be obvious from the foregoing that an exceedingly practical and efficient clamp has been provided, one that meets the requirements in its particular class of work in a highly satisfactory manner. The device in addition to its cheapness of manufacture, will save a considerable amount of labor expense as compared with the old type of clamping where a bushing connection is employed.

It is to be understood that the invention is not limited to the precise construction set forth, but that it includes within its purview whatever changes fairly come within either the terms or the spirit of the appended claims.

Having described my invention what I claim is:—

1. A device of the character described for clamping the end of a conduit, comprising a two-part clamp having lower flanged ends for engagement over the edges of an opening formed in an outlet box, the inner surfaces of said two-parts so shaped as to impart a fulcrum action thereof upon the sides of the conduit when the clamp is forced into clamping engagement with the conduit, said fulcrum action causing the lower flanged ends to rock outwardly into firm engagement with the edges of the opening, means for drawing together said two-parts and grounding means adapted to pierce the metal of the conduit during clamping.

2. A device of the character described for clamping an electric conduit to an outlet box, comprising identical co-acting clamping elements, the inner clamping surfaces of which are formed upon an arc longitudinally, piercing elements formed upon said surfaces, flanges formed upon the lower ends of said elements, said flanges terminating adjacent the sides of the elements for forming a straight vertical portion, means for forcing said elements into clamping engagement with the conduit, said forcing action resulting in a rolling or fulcrum movement of the arcuate surfaces upon the sides of the conduit, causing the lower flanged ends to rock outwardly into firm engagement with the edges of an opening formed in the outlet box, said action further causing said piercing elements to pierce the metal of the conduit.

3. A conduit clamp for use in connection with outlet boxes having an opening formed therein, comprising a pair of identical co-acting clamping members having longitudinally arcuate inner surfaces proportioned to contact with the walls of a conduit, pointed lugs formed upon said arcuate faces, grooved flanges formed upon said members at their lower ends, said grooved flanges terminating in straight vertical portions adjacent the sides of the members, apertured ears formed upon said members at their upper ends, draw bolts engaging said ears, said grooved flanges adapted to engage over the edges of the opening of said outlet box, said members when drawn toward each other at their upper ends partaking of a fulcrum motion upon said arcuate surfaces for spreading the lower flanged ends of said members whereby said flanges will firmly engage the edges of said opening, said fulcrum and clamping motion causing said pointed lugs to bite into the metal of the conduit.

In testimony whereof I affix my signature.

NORMAN O. HOUGHTON.